US006309491B1

(12) United States Patent
Chang

(10) Patent No.: US 6,309,491 B1
(45) Date of Patent: Oct. 30, 2001

(54) METHOD OF MAKING DECORATIVE POTTERY

(75) Inventor: Inwoo Chang, 106 Forestview Dr., Williamsville, NY (US) 14221

(73) Assignee: Inwoo Chang, Williamsville, NY (US)

( * ) Notice: Subject to any disclaimer, the term of this patent is extended or adjusted under 35 U.S.C. 154(b) by 0 days.

(21) Appl. No.: 09/521,642

(22) Filed: Mar. 8, 2000

(51) Int. Cl.[7] .............................. B32B 31/00; C03B 29/00

(52) U.S. Cl. .......................... 156/85; 156/89.11; 264/642; 264/679

(58) Field of Search .................................... 156/85, 89.11; 420/34.4; 264/678, 679, 642

(56) References Cited

U.S. PATENT DOCUMENTS 366,310 * 7/1887 Doulton et al. .
1,554,191 * 9/1925 Alexander .
2,181,697 * 11/1939 Kavalir .
3,642,551 * 2/1972 Laconich et al. ................. 156/89.11

* cited by examiner

*Primary Examiner*—Christopher A. Fiorilla
(74) *Attorney, Agent, or Firm*—Arthur S. Cookfair

(57) ABSTRACT

A pottery article decorated with a selected rock, such as a lava rock, is prepared by shaping a pottery article, such as a vase, from pottery clay, then partially drying the vase and forming a hole in the side of the vase, large enough to force the rock into so that it will be held in place by the surrounding pottery clay. The edges of the hole are cut to a sharp angle. A multiplicity of smaller holes are formed in the pottery clay in the region around the rock to inhibit the cracking of the pottery from cracking due to shrinkage during subsequent drying and firing. The pottery is then dried at room temperatures for about two weeks. Optionally, the holes may be filled with a moist clay/glaze mixture and dried again. The article is then fired at a cone 08 for about twelve hours and cooled, then glazed by dipping in a glaze bath and firing again at a cone 05 for about six hours.

6 Claims, 4 Drawing Sheets

SECTION A–A

METHOD OF MAKING DECORATIVE POTTERY

BACKGROUND OF THE INVENTION

1. Field of the Invention

This invention relates to decorative pottery articles and a method of making them and, in particular to composite pottery articles wherein a selected object is incorporated into a pottery article.

2. Background and Brief Description of the Prior Art

In the field of ceramic art or pottery, there is a continual effort to find new and desirable decorative effects and methods to create such effects. From the standpoint of the consumer, one such desirable and decorative effect may be achieved when an object of particular interest to the consumer is incorporated as a visible three dimensional constituent in the outer surface of the pottery, as opposed to being merely a two dimensional surface decoration . Thus, for example, a tourist visiting a site of volcanic activity, such as Hawaii, might find a decorative pottery article even more attractive as a momento of a trip if the pottery displayed, as a visible constituent, a piece of lava rock from a local volcano. However, the incorporation of an object such as a lava rock as a constituent in a ceramic or pottery article is difficult since the physical properties of lava rock are different from those of the materials used in the manufacture of pottery articles and may be incompatible therewith as well as unsuitable for the conditions of manufacture of the pottery. For example, a lava rock, incorporated in potter's clay may loosen and separate, or cause the pottery article to crack as a result of shrinkage during drying and firing. As a result, the decoration of a pottery articles is generally restricted to creating such decoration in the form of a two dimensional design on the surface of the pottery or encapsulating a three dimensional object within a thick glass surface layer of a composite glass and ceramic article. The latter approach can result in problems of incompatibility of the encapsulated object with the material of the thick glass layer as well as the ceramic.

U.S. Pat. No. 1,158,863 describes a process for applying an ornament or design to a pottery article and subsequently baking the design onto the surface of the pottery.

U.S. Pat. No. 2,357,399 discloses the manufacture of composite glass and ceramic articles wherein a surface element may be encapsulated within a thick glass outer layer.

U.S. Pat. No. 2,246,052 discloses a process of making a mosaic by forming the mosaic design by molding or routing prior to firing and avoiding the necessity of placing individual pieces of the design in place.

It is an object of the present invention to provide pottery or ceramic articles having incorporated into the article a decorative object.

It is a further object to provide a method for incorporating selected objects into a pottery or ceramic article.

It is a still further object to provide a method for producing a decorative pottery article having a selected rock incorporated into the pottery article.

It is as still further object to provide a decorative pottery article having incorporated therein a selected rock.

SUMMARY OF THE INVENTION

The above and other objects are achieved in accordance with the present invention which provides a method for incorporating a selected rock into a decorative pottery article comprising the steps of A) shaping the pottery article from pottery clay and partially drying the shaped article;

B) forming a first hole in the surface of the pottery article, sized to hold the selected rock;

C) forming a shrinkage cushion in the wall of the pottery article, in the region surrounding the hole of step (B);

D) placing the selected rock within the first hole so that it is held in place by the surrounding clay;

E) drying the pottery article;

F) firing the pottery article.

The decorative pottery article of the invention may take any of the various forms commonly associated with the pottery art. Thus the pottery article may be a vase, amphora, tile, mug, or the like made from fired clay and glazed, if desired.

The method of the invention is designed to inhibit the cracking of the pottery due to shrinkage of the pottery clay during drying and firing while the selected rock remains relatively stable. Air drying may result in about a 12% shrinkage of the pottery clay and firing may result in about a 1–2% shrinkage while the rock undergoes no shrinkage.

The shaping and partial drying of the pottery article, as in step (A), are carried out in a conventional manner. The partial drying in step (A) is preferably carried out at ambient conditions for one or two days. The forming of the first hole, that is, the hole into which the selected rock will be positioned (step B, above) may be carried out by various procedures. The hole may be formed either as a through hole or as a depression hole. In one embodiment, using the selected rock as a guide, a cutting pattern of appropriate size is traced onto the surface of the partially dried pottery article and the pottery wall is then cut, for example with a knife, along the pattern to form a through hole into which the rock may be forced. It is preferred to cut the edge of the clay surrounding the hole to a tapered edge, preferably forming an angle such as, about a 45° with the point of the angle facing the rock position. The narrowing of the clay wall at this point contributes to the inhibition of shrinkage.

In another embodiment, the first hole may be formed as a depression hole rather than as a through hole. This may be accomplished by simply pushing or pressing the rock (or other suitably sized object) into the pottery wall, without cutting, before the pottery is completely dry. The rock, or other object, is then removed leaving a depression hole of sufficient size to accommodate the rock.

In step (C), a shrinkage cushion is formed to compensate for shrinkage and inhibit cracking of the pottery during drying and firing. The shrinkage cushion may be provided in various forms. In one embodiment, where the first hole is a through hole into which the selected rock will be placed, the shrinkage cushion may be provided in the form of a multiplicity of secondary smaller holes, preferably through holes, in the pottery wall in the region surrounding the first hole. In an alternative embodiment, the shrinkage cushion may be provided in the form of a groove in the pottery wall, surrounding the first hole. The groove is preferably cut to a depth extending about 75 to 85%, ideally about 80%, through the clay wall. Grooves of shallower depth are less effective in inhibiting the cracking of the pottery during drying and firing. Deeper grooves may unduly weaken the pottery wall. The holes and/or grooves that are used as shrinkage cushions may be of various cross-sectional shapes, such as round, triangular, rectangular or other. When the first hole (step B) into which the rock will be placed, is a depression hole, a shrinkage cushion may be formed by drying the pottery article, for example, at ambient conditions for about 10 days to two weeks, then partially filling the depression hole with a moist clay/glaze mixture.

The glaze/clay mixture serves as an adhesive to hold the rock in place as well as serving as a shrinkage cushion to inhibit the cracking of the pottery wall during subsequent drying and firing cycles.

When the rock is placed in the wall of the partially dried pottery, it is preferred to first wet the rock by dipping in water prior to placing. When the hole of Step B is a depression hole, it is preferred to coat at least the underside of the rock with clay/glaze mixture before placing it in the hole. The remaining empty space in the depression hole may subsequently be filled with additional clay/glaze mixture.

The article is dried in a conventional fashion at room temperature, typically for about two weeks, after which (step F) the holes and/or groove, are filled with a moist clay/glaze mixture. The clay/glaze mixture has a lower softening point than clay and thus serves as a cushion to inhibit cracking. The composition of the clay/glaze mixture employed is typically between about 40/60 and about 60/40, and is most preferably about a 50/50 mixture. After each application of clay/glaze mixture, it is generally preferred to dry the pottery article before proceeding.

The article is then dried again and fired, preferably at a cone 08 temperature, for about twelve hours and cooled for about 12 hours. Preferably, the article is then coated with glaze, for example by dipping in glaze, and then dried and fired again, preferably at a cone 05, for about twelve hours.

EXAMPLE 1

A pottery vase was shaped from stoneware clay, in a conventional manner, using a pottery wheel. The vase was dried for a period of about 24 hours at room temperature. A piece of Hawaiian lava rock was selected and a hole was cut in the wall of the vase, sized to hold the lava rock. The edges of the hole were thinned by cutting to a sharp edge (about a 45° angle) to inhibit the shrinkage rate during subsequent drying. Several smaller holes were drilled through the wall of the vase in the region surrounding the first hole to provide a shrinkage cushion to inhibit cracking during subsequent drying and firing. The lava rock was sprayed with water and inserted in the hole. The vase was then dried at room temperature for about two weeks, after which the smaller holes in the region around the rock were filled with a 50/50 mixture of clear transparent Gloss glaze GG-1700 and Stoneware Clay No. 153 (powder clay). After drying for 24 hours, the holes were further filled with the 50/50 clay/glaze mixture and the vase was again dried for 1–2 days at room temperature. The vase was then fired at cone 08 (1737° F.) for 12 hours; then cooled for 12 hours. A clay/glaze mix was then used to fill in any space between the rock and the pottery. The vase was then dipped into a glaze bath; dried for 1–2 days; then fired at cone 05 (1891° F.) for 12 hours and cooled for 12 hours.

EXAMPLE 2

Following the general procedure of Example 1, a pottery vase was shaped, partially dried and a hole cut in the wall of the vase, sized to hold a selected lava rock. A groove was carved into the pottery wall in a circle surrounding the hole where the rock was to be placed, to provide a shrinkage cushion. The groove was carved to a depth of about 80% of the thickness of the pottery wall. The selected rock was then wetted and placed in the hole and the vase was allowed to dry for about two weeks. The groove was then filled with a moist clay/glaze mixture (about 50/50 mixture) and allowed to dry for about 24 hours. The process of filling the groove with clay/glaze mixture and drying was repeated twice to fill the groove and form a smooth surface The vase was then fired at cone 08 for 12 hours, then cooled for 12 hours. The vase was then coated with glaze in a conventional manner, fired at cone 05 for about six hours and allowed to cool.

EXAMPLE 3

A pottery vase was shaped from stoneware clay and partially dried over a 36 hours at room temperature. A decorative lava rock was selected and pushed into the face of the partially dried vase to form a depression hole appropriately sized to hold the rock. The rock was removed and the vase was allowed to dry at room temperature for about two weeks. The depression hole was then coated with a 50/50 moist clay/glaze mixture. The rock was then placed in the depression hole and empty space therein was filled with additional clay/glaze mixture. The pottery vase was then dried, fired, glazed, dried and fired again as in Example 1.

BRIEF DESCRIPTION OF THE DRAWINGS

The present invention and the manner in which it may be practiced are further illustrated by the accompanying drawings, wherein.

DETAILED DESCRIPTION

Figure 1:
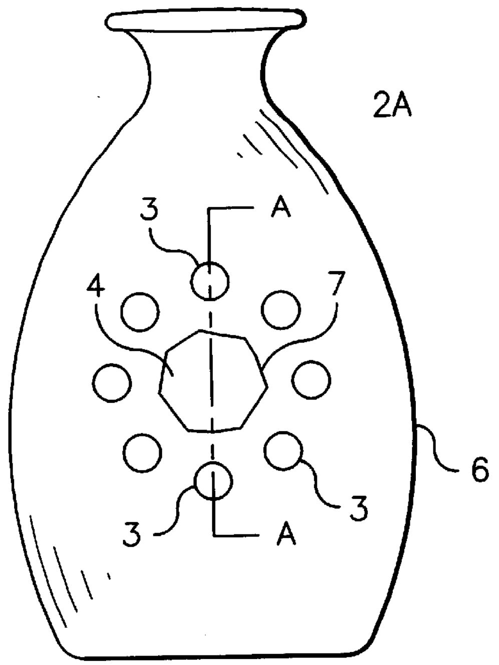
FIG. 1 depicts a front view of a pottery article in accordance with the invention.
Figure 2:
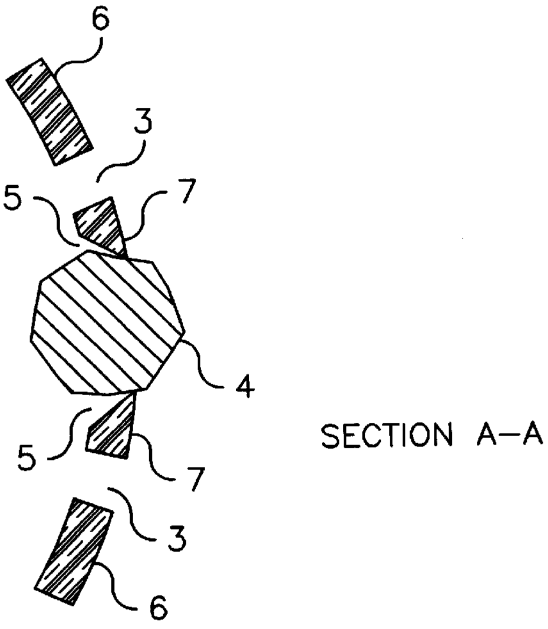
FIG. 2 is a cross-sectional view of the pottery article of FIG. 1, taken along the line A—A'.

With reference to FIGS. 1 and 2, there is illustrated a pottery article 2 in the form of a vase, made in accordance with the invention. The face of the vase holds a selected lava rock 4 set into a through hole 5 in the wall 6 of the vase, preformed with the edge 7 of the hole cut to about a 45° angle as described hereinabove. A series of smaller holes 3 have been formed in the region around rock 4 to serve as a shrinkage cushion to inhibit cracking from shrinkage during drying and firing. If desired, the smaller holes 3 may be placed in a decorative pattern around hole 5 and thus may have a desirable esthetic value as well as a functional value.

Figure 3:
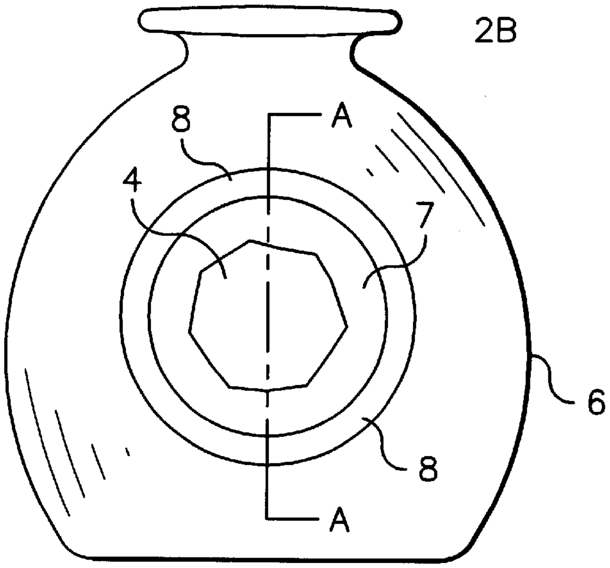
FIG. 3 is a front view of an alternate embodiment of a pottery article in accordance with the invention.
Figure 4:
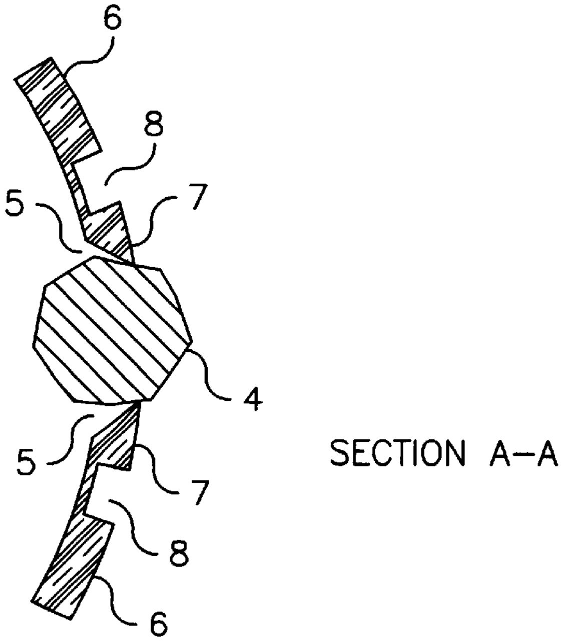
FIG. 4 is a cross-sectional view of the pottery article of FIG. 3, taken along the line A—A.

FIGS. 3 and 4 depict an alternate embodiment of the invention wherein a shrinkage cushion is provided in the form of a groove 8 in wall 6 of the pottery article surrounding hole 5. Groove 8 is preferably cut to a depth of between about 75% to 85%, and most preferably about 80%, through the wall of the pottery. A deeper groove might unduly weaken the wall. Shallower grooves would provide less protection against cracking due to shrinkage during drying and firing. Groove 8 is shown in a preferred embodiment in FIG. 4 as a channel groove, that is having a generally rectangular cross-section. However it may also be formed as groove having a V-shaped or U-shaped or other cross-sectional shape.

Figure 5:
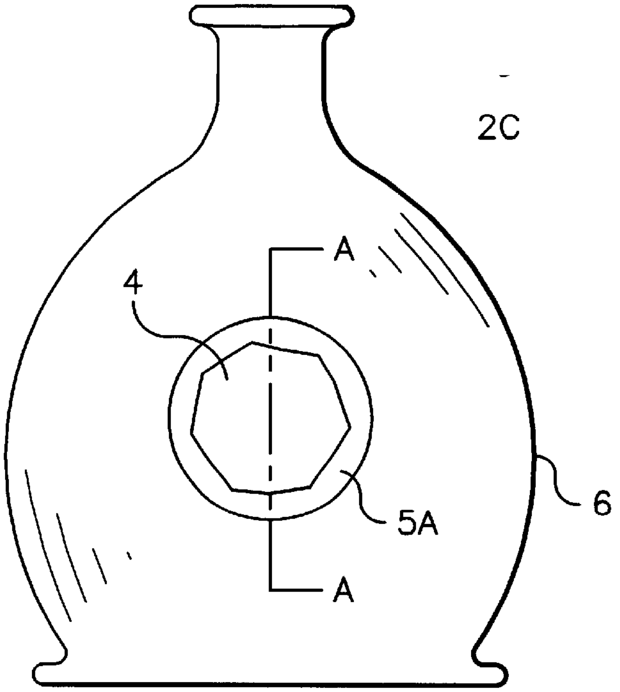
FIG. 5 is a front view of a different embodiment of a pottery article in accordance with the invention.
Figure 6:
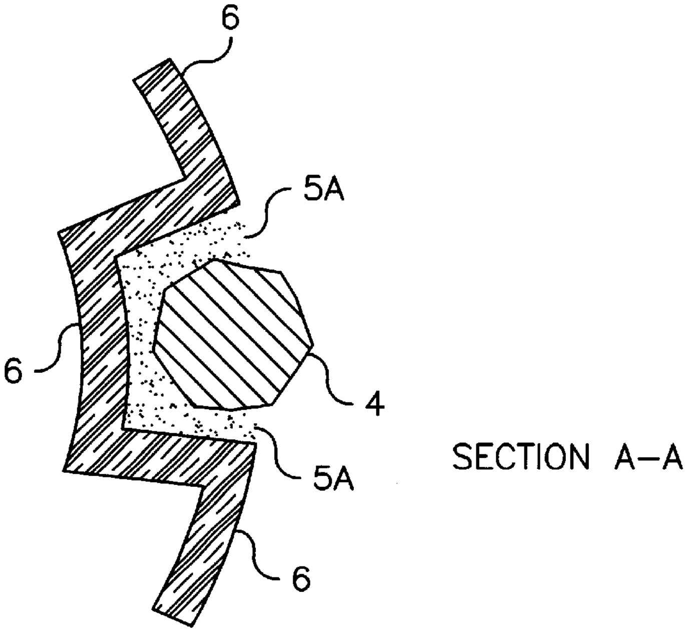
FIG. 6 is a cross-sectional view of the pottery article of FIG. 5, taken along the line A—A.

FIGS. 5 and 6 illustrate another alternate embodiment of the invention wherein hole 5*a* for the placement of the selected rock 4 has been formed as a depression hole, rather than as a through hole, by pressing rock 4, or other appropriately sized object, into the wall 6 and then removing the rock or other object used to form the hole 5*a*. The pottery article 2*c* is then dried, After drying, rock 4 is coated, at least on the underside thereof, with a moist clay/glaze mixture; the hole 5*a* is at least partially filled with the clay/glaze mixture and the rock is placed into the hole again. The pottery article is then dried and fired.

Figure 7:
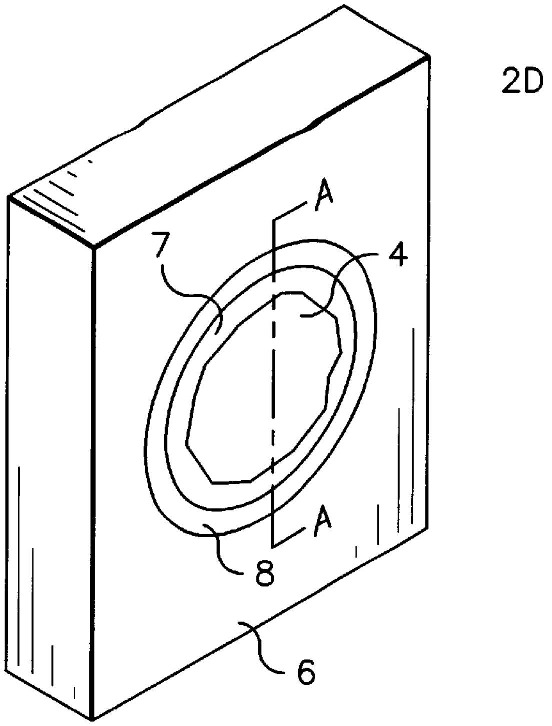
FIG. 7 is a front perspective view of a ceramic tile in accordance with the invention.
Figure 8:
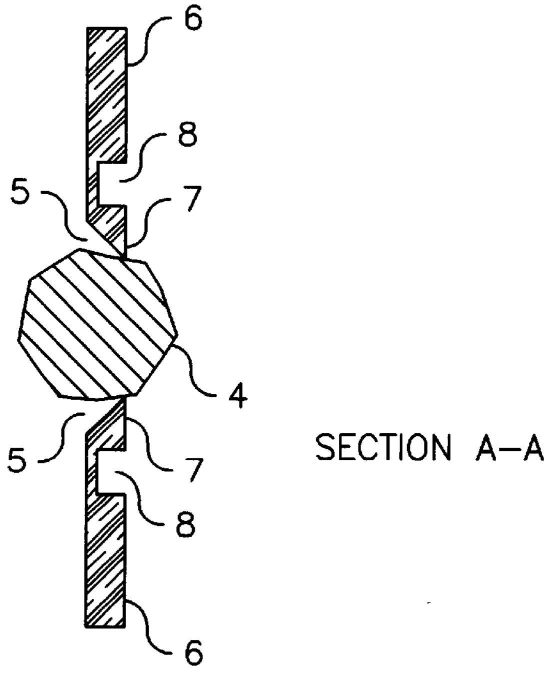
FIG. 8 is a cross-sectional view of the ceramic tile FIG. 7 taken along the line A—A.

FIGS. 7 and 8 depict another alternate embodiment of the invention wherein The decorative pottery article is a ceramic tile 2*d* displaying a selected lava rock 4 set into hole 5. A shrinkage cushion is provided in the form of a groove 8 in the tile surrounding the hole 5 and the edge 7 of the hole has been thinned by cutting to a sharp angle.

Although the invention has been described with reference to certain preferred embodiments, it will be appreciated by those skilled in the art that modifications and variations may be made without departing from the spirit and scope of the invention as defined by the appended claims.

What is claimed is:

1. A method for incorporating a rock into a decorative pottery article comprising the steps of A) shaping the pottery article from pottery clay and partially drying the shaped article;

B) forming a first hole in a wall of the pottery article sized to hold said rock;

C) forming a shrinkage cushion in the pottery article in the region around the hole of step (B);

D) placing the rock within said first hole so that it is held in place by the surrounding clay;

E) drying the pottery article;

D) firing the pottery article.

2. A method according to claim 1 wherein said shrinkage cushion is a groove in said wall, extending to a depth of about 75–85% of the thickness of said wall and surrounding said first hole.

3. A method according to claim 2 wherein said groove is subsequently filled with a clay/glaze mixture and the pottery article is again dried and fired.

4. A method according to claim 1 wherein said shrinkage cushion is a multiplicity of holes surrounding said first hole.

5. A method according to claim 4 wherein said holes are subsequently filled with a clay/glaze mixture and the pottery article is again dried and fired.

6. A method according to claim 1 wherein said first hole is a depression in said wall of sufficient size to loosely hold said rock and said shrinkage cushion is a filling of clay/glaze mixture within said depression, holding said rock in place.

* * * * *